(12) United States Patent
Reinders et al.

(10) Patent No.: US 7,987,682 B2
(45) Date of Patent: Aug. 2, 2011

(54) EVAPORATIVE COOLER, HEAT RECOVERY DEVICE, AND VENTILATION DEVICE

(75) Inventors: Johannes Antonius Maria Reinders, Warnsveld (NL); Andreas Jacobus Louis Nijsen, Enschede (NL)

(73) Assignee: Oxycom Beheer B.V., Raalte (NL)

( * ) Notice: Subject to any disclaimer, the term of this patent is extended or adjusted under 35 U.S.C. 154(b) by 501 days.

(21) Appl. No.: 11/632,301

(22) PCT Filed: Jul. 12, 2005

(86) PCT No.: PCT/EP2005/053337
§ 371 (c)(1), (2), (4) Date: Jan. 12, 2007

(87) PCT Pub. No.: WO2006/005758
PCT Pub. Date: Jan. 19, 2006

(65) Prior Publication Data
US 2008/0047686 A1    Feb. 28, 2008

(30) Foreign Application Priority Data

Jul. 12, 2004  (GB) .................................. 0415549.5

(51) Int. Cl.
*F28D 5/00* (2006.01)
(52) U.S. Cl. ...................................................... 62/314
(58) Field of Classification Search ........... 62/99, 259.4, 62/304, 314; 165/60, 108, 115
See application file for complete search history.

(56) References Cited

U.S. PATENT DOCUMENTS

| 5,315,843 | A  | * | 5/1994 | Morozov et al. ................ 62/309 |
| 6,338,258 | B1 |   | 1/2002 | Lee et al. |
| 2003/0209017 | A1 |  | 11/2003 | Maisotsenko et al. |
| 2005/0056029 | A1 | * | 3/2005 | Maisotsenko et al. .......... 62/121 |
| 2006/0124287 | A1 |   | 6/2006 | Reinders |

FOREIGN PATENT DOCUMENTS

| EP | 0846923 A | 6/1998 |
| NL | C 1021794 * | 10/2002 |
| NL | 1021794 C1 | 5/2004 |
| WO | WO03/091633 A1 | 11/2003 |
| WO | WO2004/009225 A1 | 1/2004 |

* cited by examiner

*Primary Examiner* — Melvin Jones
(74) *Attorney, Agent, or Firm* — Hoyng Monegier LLP; Coraline J. Haitjema; David P. Owen

(57) ABSTRACT

An evaporative heat exchanger is provided with a working channel that has primary and secondary surfaces and a plurality of product channels. The product channels have primary and secondary surfaces. A liquid supply provides an evaporative liquid to the secondary surfaces. A product fluid may circulate through the product channels in heat exchanging contact with the primary surfaces thereof. The primary surface of the working channel is in flow communication with the secondary surfaces of both the working channel and the product channels such that a working fluid may flow first over a primary surface of the working channel and subsequently over the secondary surfaces where it absorbs liquid by evaporation.

21 Claims, 9 Drawing Sheets

EVAPORATIVE COOLER, HEAT RECOVERY DEVICE, AND VENTILATION DEVICE

BACKGROUND OF THE INVENTION

1. Field of the Invention

The present invention relates to heat exchange devices and more particularly to evaporative heat exchangers. It also relates to such devices that can also operate to provide heat recovery in combination with ventilation.

2. Description of the Related Art

An evaporative cooler is a device that uses the latent heat of evaporation of a liquid to provide cooling. The principle of evaporative cooling has been known for many centuries. For example, a damp cloth placed over an object will keep the object cool by evaporation of liquid from the cloth. By continuously adding liquid to the cloth, the cooling effect may be maintained indefinitely without input of electrical energy. The lowest temperature that can be reached by evaporation of moisture in this way into an air stream defines the wet-bulb temperature for that air. An indirect evaporative cooler makes use of this principle. A product air stream over a primary surface of a heat exchange element may be cooled by a working air stream passing over and absorbing moisture from a secondary wetted surface of the heat exchanger.

According to theory, if a quantity of air is cooled by direct evaporation its absolute humidity increases due to the uptake of moisture. Its relative humidity also increases due to its lowered temperature until at the wet bulb temperature it is full saturated with water vapour. If the air is cooled without direct evaporation however, its absolute humidity remains the same. As its temperature decreases only the relative humidity increases until full saturation of the air is reached at the so-called dew point. The dew point is thus lower than the wet bulb temperature and is in fact defined as the temperature to which a body of air must be cooled to reach saturation or 100% relative humidity. At this point, water vapour in the air condenses.

Attempts have been made to improve on the principle of indirect evaporative cooling by cooling or drying the working air stream prior to evaporation taking place. A particularly convenient way of cooling the working air stream is to feed-back a portion of the cooled product air. Such devices are often referred to as dewpoint coolers as they may lower the temperature of the product air to below its wet bulb temperature and close to the dewpoint. By optimising the surfaces with which the air streams exchange heat, highly effective heat transfer can be achieved. This has been found especially significant in the case of the heat transfer from the wetted secondary surface. In order to provide moisture to the working air stream, the wetted secondary surface may be provided with some form of liquid supply e.g. in the form of a hydrophilic layer. The presence of such a layer can however result in increased thermal isolation of the secondary surface from the working air stream, thus reducing heat transfer.

A particularly efficient form of dewpoint cooler is known from PCT/NL03/00153, the contents of which are hereby incorporated by reference in their entirety. While not wishing to be bound by theory, it is believed that the success of this device is due at least in part to the presence of heat transfer elements on the primary and secondary surfaces. These heat transfer elements may be in the form of fins and are believed to improve transmission of heat from the primary surface to the secondary surface. The fins act both to directly conduct heat and also to break up the various boundary layers that develop in the flow. They also serve to increase the total area available for heat exchange on the relevant surfaces. Further important features of the wetted second surface are known from that document and also from copending UK patent application No 0324348.2, the contents of which are also incorporated by reference in their entirety. Accordingly, by careful choice of the material used as a water retaining layer, optimal evaporation may be achieved without thermal isolation of the secondary surface from the working air stream.

Such devices are extremely convenient for cooling as they are simple to produce and require no refrigerant or compressor. Air may be circulated through the cooler using a low pressure fan which has low energy consumption and is relatively silent. This makes the dewpoint cooler ideal for domestic use, especially at night.

The driving force for cooling in an evaporative cooler is the temperature differential between the wetted heat exchange surface, the working air passing over it and the flow of product air. The greater the efficiency of the cooler and the closer the dewpoint is approached, the more critical is the balance between these temperature differentials. For an evaporative cooler communicating between ambient air and the interior of a building or vehicle, the prevailing wind and pressure differentials can upset this fine balance. Furthermore, the performance of the cooler is dependent upon the inlet and outlet configurations. On installation of an evaporative cooler e.g. in a building using conduits to supply the product and/or working air streams, it may be necessary to carefully calibrate the unit to operate efficiently according to the relative flow resistances of the product and working air conduits.

BRIEF SUMMARY OF THE INVENTION

According to the present invention, there is provided an evaporative heat exchange device comprising a product circuit and a working circuit, the circuits being in thermal contact for heat transfer between the circuits but being fluidically separate to substantially prevent pressure transmission between the circuits. In this context, the circuits need not be closed circuits and will generally communicate with the external atmosphere, however within the heat exchange device itself, the circuits are fluidically separated at least in the evaporative cooling mode.

A preferred form of the device comprises at least one working channel having primary and secondary surfaces with, for each working channel, a plurality of product channels each having primary and secondary surfaces. The channels are arranged so that a product fluid may circulate through the product channels in heat exchanging contact with the primary surfaces thereof and wherein the primary surface of the working channel is in flow communication with the secondary surfaces of both the working channel and the product channels such that a working fluid may flow first over a primary surface of the working channel and subsequently over the secondary surfaces. A liquid supply provides an evaporative liquid to the secondary surfaces.

In this way, a first stream of working fluid passing over the primary surface of the working channel may be precooled to close to the dew point by heat transfer to the working fluid flowing over the secondary surface of the working channel. The transfer of heat is driven by the latent heat of evaporation of the evaporative liquid into the precooled air as it returns over the secondary surface. According to the invention, it has been found that the latent heat that can be absorbed by a unit volume of the precooled working air is sufficient not only to precool that volume of working air but also to cool at least a further volume of product air. The cooling of the product air is achieved in a similar way by evaporation from the secondary surfaces of the product channels.

In an advantageous construction of the evaporative heat exchanger both the working channel and the product channels may be formed as tubular membranes with, in each case, the primary surface being located on an interior of the tubular membrane and the secondary surface being located on the exterior of the tubular membrane. The tubular membrane provides for transmission of heat between the primary surface and the secondary surface. Preferably the membranes may be formed of good thermal conducting material such as aluminium or the like.

Preferably, the evaporative heat exchanger further comprises a housing with the working channel and the product channels being located within the housing. In this way, an interior space between the housing and the working and product channels then defines a flow area for the working fluid to flow over the secondary surfaces. Preferably the housing is elongate and the working and product channels extend parallel to one another substantially lengthwise through the housing. The working channel may be arranged to have an inlet communicating with the exterior at a first end of the housing and an outlet communicating with the interior space adjacent a second end of the housing. By providing the housing with an exhaust adjacent its first end, communicating the interior space with an exterior of the housing, the working fluid can be caused to flow back over the secondary surfaces from the second end towards the exhaust. The flow of secondary fluid over the secondary surfaces is thus in counterflow with the flows over the primary surfaces of both the working channel and the product channels.

According to an important aspect of the invention, the product channels may extend through the housing from an inlet to an outlet, both of which communicate the primary surfaces of the product channels with an exterior of the housing, without fluid connection to the interior space. By hermetically separating the primary surfaces of the product channels from the interior space containing the working fluid, pressure effects in the working fluid will not effect the flow of product fluid and vice-versa. Nevertheless, heat exchange will take place between the two fluids as the working fluid flows over the secondary surfaces of the product channels.

An important consequence of the construction according to the present invention is that the evaporative heat exchanger can also function as a waste heat recovery device e.g. for ventilation purposes. By providing a recirculation channel with a heat recovery bypass for connecting the interior space of the housing with a source of waste heat, selective entry of a heat recovery fluid into the interior space can be allowed for flow over the secondary surfaces. In this case, the product fluid will be heated by heat transfer from the heat recovery fluid which flows through the interior space and exits through the exhaust. Of significance in this arrangement is that the direction of flow of the product fluid is identical during both cooling and heat recovery and that flow over the secondary surfaces is always towards the exhaust. This avoids e.g. contamination which may otherwise occur on reversal of a fluid flow or if flow from the secondary surfaces should enter the living space. While heat recovery in general is known, it is believed that the combination of an evaporative cooler that can also provide heat recovery is both new and inventive. It provides great versatility of the device, allowing cooling, ventilation (without water supply) and heat recovery from a single unit.

Preferably, the heat recovery bypass comprises a valve for switching the source of the fluid supplied to the secondary surfaces between the primary surface of the working channel in a cooling mode and the recirculation channel in a heat recovery mode. In a ventilation only mode, no fluid need be supplied to the secondary surfaces and the recirculation channel may be used to exhaust air from the building without further heat exchange.

A further advantage of the inclusion of a recirculation channel is that a recirculation flow can selectively be added to the product channel or channels. The recirculation channel may comprise a mixing arrangement for selectively connecting the recirculation channel to the inlet of the product channels. Thus, during cooling of e.g. a building, the amount of outside air admitted to the interior of the building via the product channel can be regulated as can the amount of interior air recirculated through the product channel. This may be effective under certain circumstances for preventing transmission of noise or odours or other disagreeable effects into the interior of a building.

Preferably, the evaporative heat exchanger is further provided with product fluid circulation means to cause circulation of a product fluid through the product channels and also with working fluid circulation means to cause circulation of the working fluid through the working channel and over the secondary surfaces.

According to an important feature of the invention, heat transfer elements are located on the secondary surfaces for transferring heat from the secondary surfaces to the working fluid. These heat transfer elements are preferably formed as fins, louvres or protrusions and may also increase heat transfer by serving to break up the boundary layers and increase local turbulence. Preferably, the heat transfer elements are made from a good thermally conducting material such as aluminium or the like. It is believed that the use of such heat transfer elements can increase the efficiency of the device to such an extent that a number of volumes of product fluid can be effectively cooled by a single volume of working fluid In order to provide for transfer of latent heat from the secondary surfaces into the working fluid, the secondary surfaces should be provided with a liquid retaining layer for retaining a quantity of the evaporative liquid. It has been found important for efficient operation that the liquid retaining layer should not impede the direct transfer of heat from the secondary surface to the working fluid. This direct transfer of "thermal" rather than latent heat is necessary for heating the working fluid away from the dewpoint such that it can evaporate further liquid. The liquid retaining layer should thus not insulate the secondary surfaces. Thus if the liquid retaining layer is a good thermal conductor it may completely cover the surface. In most cases however it is believed that partial coverage provides the best balance between direct heat transfer and latent heat transfer for efficient operation. The liquid retaining layer may e.g. be provided only on the heat transfer elements and preferably only on one surface thereof.

Heat transfer elements may also be provided on the primary surfaces of the product channel and the working channel for transferring heat from the product fluid and the working fluid respectively to the primary surfaces. These heat transfer elements may be of similar nature to those on the secondary surfaces. While there is no direct need to provide evaporative liquid to the primary surfaces during operation as an evaporative cooler, for alternative use as a heat recovery device or humidifier, it may also be desirable to include a liquid retaining layer or other form of wicking layer on the primary surfaces for humidification. This layer may also be used for distributing a product such as a deodorant, fragrant oil or the like into the product fluid.

According to a further aspect of the invention there is also disclosed a method of cooling a product fluid in an evaporative heat exchanger comprising a working channel having primary and secondary surfaces and a product channel having primary and secondary surfaces. The method comprises providing an evaporative liquid to the secondary surfaces, passing a first volume of a working fluid through the working channel in heat exchanging contact with its primary surface to cool the working fluid from an inlet temperature to close to its dew point temperature, thereafter passing the working fluid over the secondary surfaces of both the working channel and the product channel to cause evaporation of the evaporative liquid into the working fluid and heating of the working fluid by conduction from the secondary surfaces whereby heat is transferred from the respective primary surfaces to the respective secondary surfaces. At the same time, a second volume of product fluid is passed through the product channel in heat exchanging contact with its primary surface such that the product fluid is cooled by heat transfer to the primary surface, with the second volume being substantially greater than the first volume. By ensuring that the working fluid is heated by conduction from the secondary surfaces rather than by evaporation of the evaporative liquid, a substantially greater volume of product fluid may be cooled for a given volume of working fluid. This conduction of thermal heat to the working fluid can be further enhanced by the presence of the heat transfer elements, in particular fins, on the secondary surfaces.

According to an additional aspect of the present invention there is provided a cooling and heat recovery device comprising an evaporative heat exchanger generally as described above, having at least a product channel and a working fluid circuit in heat exchanging contact with one another, the product channel providing a flow of product fluid from a first environment to a second environment, a recirculation channel providing a flow of fluid from the second environment, and a switching device for selectively connecting the recirculation channel to the product channel or the working fluid circuit.

BRIEF DESCRIPTION OF THE DRAWINGS

An embodiment of the invention will now be described in further detail by way of example only with reference to the accompanying figures, in which.

DESCRIPTION OF ILLUSTRATIVE EMBODIMENTS

Figure 1:
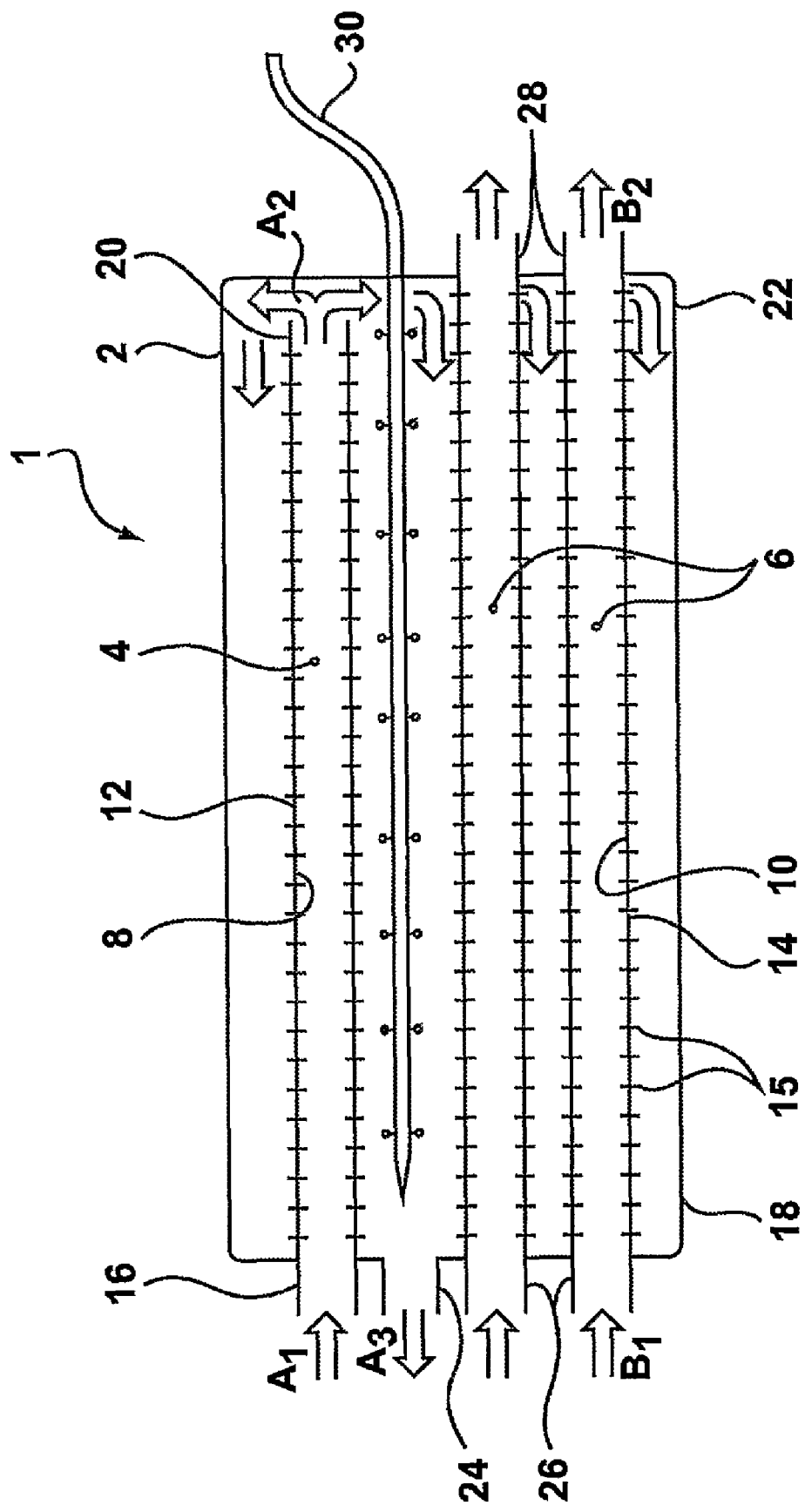
FIG. 1 is a schematic view of an evaporative heat exchanger according to the present invention.

FIG. 1 shows a schematic view of an evaporative heat exchanger 1 according to the present invention. The heat exchanger 1 comprises a generally elongate housing 2 into which extends a working channel 4. A number of product channels 6 also pass through the housing 2, the product channels 6 and working channel 4 being generally parallel and spaced from one another. The working channel 4 and product channels 6 each have respective primary surfaces 8, 10 located on the insides of the channels and respective secondary surfaces 12, 14 located on the exteriors of the channels. Both the working channel 4 and the product channels 6 are provided with a plurality of heat transfer elements 15 in the form of fins.

The working channel 4 has an inlet 16 located at an exterior of the housing 2 adjacent a first end 18 thereof. An outlet 20 from the working channel 4 is located within the housing 2 adjacent a second end 22 thereof. The housing 2 is furthermore provided with an exhaust opening 24 adjacent to the first end 18. A working circuit is thus formed for a working fluid to flow from the inlet 16, along the primary surface 8 of the working channel 4 and out of the outlet 20. The working fluid can then return through the interior of the housing 2 and exit through the exhaust opening 24. As the working fluid returns through the housing 2 it flows over the secondary surfaces 12, 14 of both the working channel 4 and the product channels 6.

The product channels 6 also have inlets 26 located exterior to the first end 18 of the housing 2 and outlets 28 located exterior to the second end 22. A product circuit is thus formed for a product fluid to flow from the outside of the housing 2, through the inlets 26, along the primary surfaces 10 of the product channels 6 and out of the outlets 28.

The housing 2 is also provided with a liquid supply device 30 which provides an evaporative liquid to the secondary surfaces 12, 14.

The working channel 4 and the product channels 6 are formed to favour transverse heat transfer between the respective primary 8, 10 and secondary 12, 14 surfaces over longitudinal conduction. This may be achieved by forming the channels using a membrane of low thermal conductivity that is nevertheless sufficiently thin such that transverse heat transfer is not inhibited. Preferably however, the channels are formed of a material that conducts heat well, especially in the transverse direction across the membrane. The heat transfer elements 15 provided on these channels 4, 6 serve to increase such transverse heat transfer and are also preferably made of a good heat conducting material.

Operation of the evaporative heat exchanger 1 takes place as follows. A stream of working fluid $A_1$ is provided to the inlet 16 of the working channel 4. The working fluid $A_1$ is directed over the primary surface 8. Heat transfer elements 15 transfer heat away from the working fluid causing it to become cool. As will be explained below, for air as the working fluid $A_1$, after passing over the primary surface 8 it will be cooled substantially to the dew point temperature. At this temperature, the air is fully saturated and cannot be cooled further without water condensing. After passing over the primary surface 8, the cooled working fluid exits through outlet 20 as a flow $A_2$ and is caused to return through the housing 2 in the direction of the first end 18. In doing so, it passes over the secondary surfaces 12, 14 of both the working channel 4 and the product channels 6.

By operation of the liquid supply device 30 a quantity of evaporative liquid is supplied to cause wetting of the secondary surfaces 12, 14. The working fluid $A_2$, passing over the secondary surface 12 absorbs the heat transferred from the primary surface 8 by the heat transfer elements 15. As it starts to warm-up away from the dew point, it is able to absorb additional liquid by evaporation of the evaporative liquid. In doing so, latent heat is absorbed. By ensuring that the liquid is evaporated primarily from the wetted secondary surface 12 and not from droplets within the working fluid, this latent heat causes further heat transfer from the portion of the working fluid $A_1$ flowing over the primary surface 8. The working fluid $A_2$ also flows over the secondary surfaces 14 of the product channels 6 and cools these in a similar manner. A product stream $B_1$ passed through the product channels 6 in contact with the primary surfaces 10 will also be cooled and exits from the outlets 28 as a flow $B_2$ at substantially the same temperature as that of the working fluid $A_1$ at the outlet 20. The working fluid exits the housing 2 via exhaust 24 as a flow $A_3$ fully saturated with moisture and at substantially the same temperature as on inlet.

Because the latent heat of evaporation of a liquid is generally substantially greater than its specific heat capacity, the heat absorbed by evaporation of liquid into the working fluid A at the secondary surfaces 12, 14 is sufficient not only to cool a first volume of the working fluid A but also to cool at least two further volumes of the product stream B. According to FIG. 1, a single working channel 4 serves to cool two similarly dimensioned product channels 6. It is however within the scope of the present invention that this ratio could be achieved in other equivalent ways. A single product channel having e.g. twice the flow cross-section of the working channel could be used, provided sufficient surface area for heat transfer were available. Furthermore, since the flow through the working channel is separate from that through the product channels, a difference in flow rate may also be employed to the same effect. Such a difference in flow rate may also be used to tune heat transfer between the channels. Alternatively or additionally, because of the separation of the channels, different fluids may be used having different heat capacities.

According to an important advantage of the invention, it should be noted that the working fluid A flows around an essentially closed circuit from inlet 16 to exhaust 24. Furthermore, the inlet 16 and exhaust 24 are located adjacent to one another. In this way, pressure conditions prevailing at the inlet/exhaust will have no or little effect on the circulation of the working fluid A. This has been found to be an extremely important consideration in the installation of such evaporative heat exchangers in real situations where local pressure conditions at the inlet or exhaust can adversely affect the function of the device.

Figure 2:
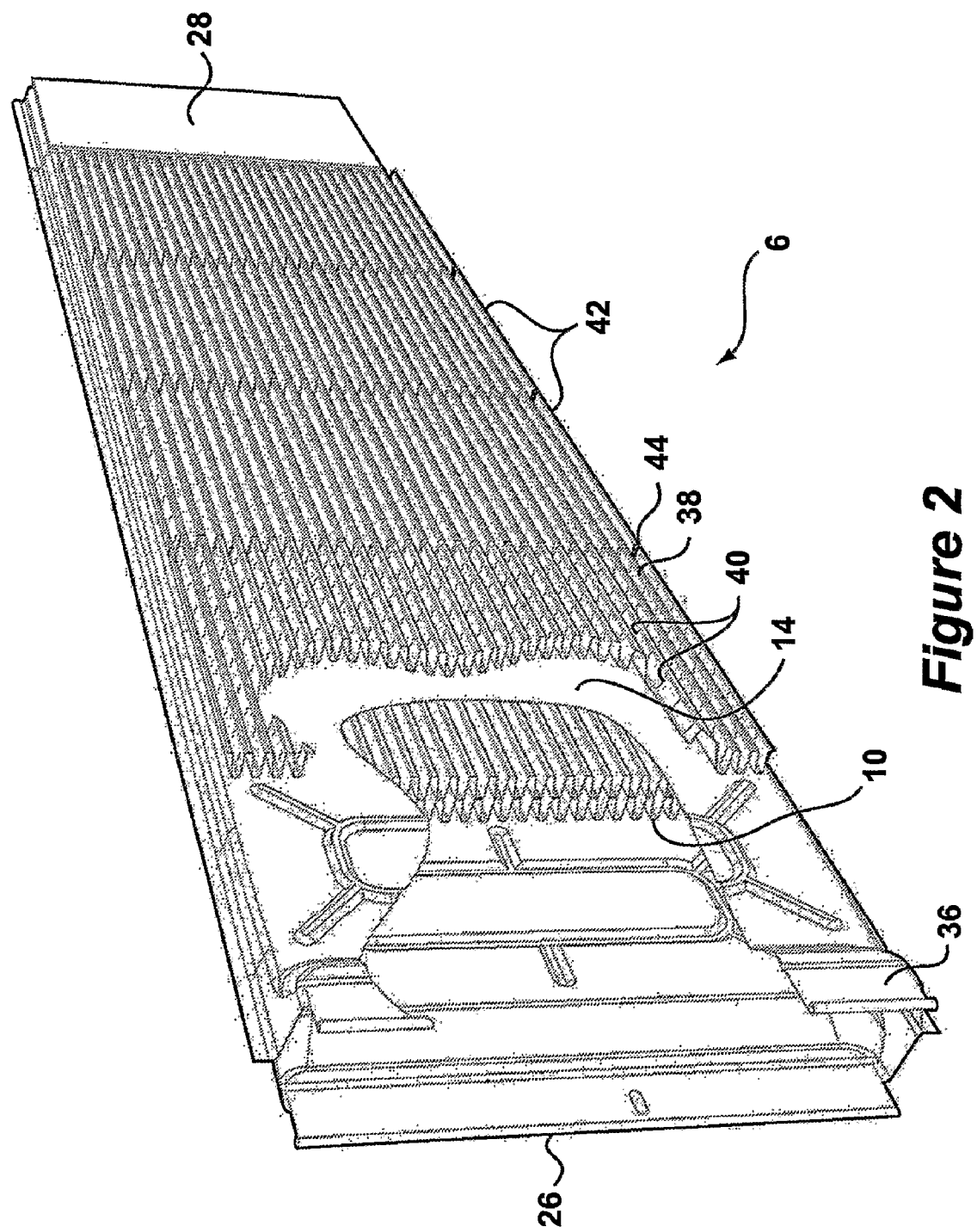
FIG. 2 is a perspective view of a heat exchange element for use as a product channel.

According to a preferred embodiment of the present invention, the product channels 6 may be constructed as shown in FIG. 2 and as described in PCT/NL03/00153. In this figure, like elements are designated with the same reference numerals as in FIG. 1. According to FIG. 2 the product channel 6 comprises a membrane 36 formed into a generally tubular construction having an inlet 26 and an outlet 28. The primary surface 10 is located in the interior of the channel 6 while the secondary surface 14 is located on the outer surface of the membrane 36. The membrane 36 may be formed of any appropriate material that can serve to separate the flows over its primary and secondary surfaces and can transfer heat between them. Preferably it is formed of soft aluminium that can be easily formed to the desired shape and can be easily joined by heat seal techniques. The membrane 36 is provided with heat transfer elements in the form of fins 38 on both the primary 10 and secondary 14 surfaces. The fins 38 increase the effective surface area of these surfaces available for heat transfer to the streams. They also improve heat transfer to and across the membrane 36. For this reason, they should be made from a material having good heat conduction properties such as aluminum. By forming both the membrane 36 and the fins 38 of aluminum, heat transfer may be optimized.

In order to further improve heat transfer, the fins 38 are provided with louvers 40 which serve to break-up the various boundary layers in the flow and also encourage flow from one side of the fin to the other. The louvers 40 also encourage the conduction of heat in the direction of the louver but reduce conduction in the longitudinal direction of flow. This effect may be further enhanced by providing additional barriers to conduction in the longitudinal direction e.g. by conduction bridges or by staggering the louvers 40. Additionally or alternatively, the fins 38 are arranged in strips 42, separated from one another in the longitudinal direction by gaps 44.

The fins 38 on the secondary surface 14 of the product channel 6 are provided with a liquid retaining layer (not shown) which may be as described in UK Application No 0324348.2. The liquid retaining layer is applied on the outermost surface of the fins 38 facing away from the membrane 36. In this way, the secondary stream flowing over the secondary surface 14 is repeatedly exposed to direct heat from the uncovered regions and latent heat by evaporation from the covered regions as it passes from one side of the fin 38 to the other e.g. through the louvers 40. The liquid retaining layer may be formed of any material that is capable of retaining a quantity of liquid and relinquishing it easily into a partially saturated air stream. Preferably, for use with water as the evaporative liquid, the material should be hydrophilic but have little hygroscopic activity. Ceramic type materials such as Portland cement and aluminium oxide and fibrous materials have been found ideal, as they are able to retain water primarily by surface tension effects only. An exemplary material for forming the water retaining layer is a 20 g/m2 polyester/viscose 50/50 blend, available from Lantor B.V. in The Netherlands.

Although not shown, the working channel 4 may be constructed in a substantially similar way to the product channel of FIG. 2. In this case, the working channel may differ slightly from the product channel in that the outlet may be shorter as it will not extend out of the housing.

Figure 3:
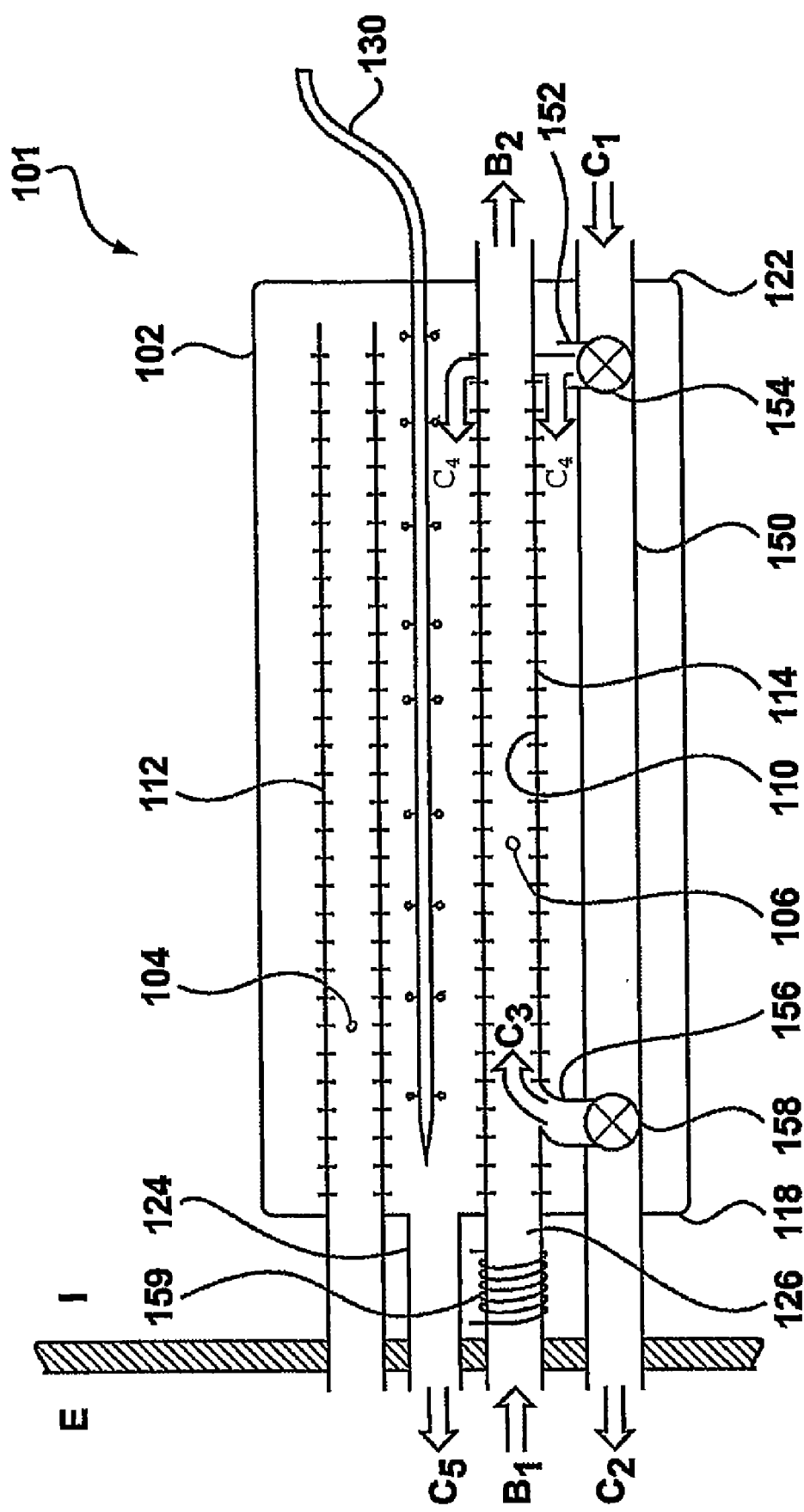
FIG. 3 is a schematic view of an evaporative heat exchanger according to a second embodiment of the invention provided with a recirculation channel.

FIG. 3 illustrates an evaporative heat exchanger 101 according to a preferred embodiment of the present invention including a recirculation channel. The heat exchanger 101 is generally similar to the device described in FIG. 1 and like elements will be designated with the same reference numerals preceded by the numeral 1.

According to FIG. 3, heat exchanger 101 additionally comprises a recirculation channel 150. The recirculation channel passes through the housing 102 from second end 122 to first end 118. In the embodiment depicted in FIG. 3, only a single product channel 106 is shown. Clearly, as described in relation to the first embodiment, a number of product channels may be provided for each working channel 104. The recirculation channel 150 is provided with a heat recovery bypass 152 connecting the recirculation channel 150 with the interior of the housing 102 adjacent to its second end 122. A bypass valve 154 controls the flow of fluid through the recirculation channel 150 and heat recovery bypass 152.

Recirculation channel 150 is also provided with a recirculation bypass 156 provided with a recirculation valve 158. Recirculation bypass 156 connects recirculation channel 150 to the product channel 106 adjacent to the first end 118. Recirculation valve 158 controls the flows of fluid through the recirculation bypass 156 and recirculation channel 150. Although the valves 154 and 158 have been depicted at the intersections of the respective junctions, it is clear that other arrangements and locations of valve may also be provided to achieve the same function as will be described below.

In use, evaporative heat exchanger 101 may function in the same way as evaporative heat exchanger 1. Additionally however, the presence of the recirculation channel 150 permits two further functions:

I. Recirculation of Interior Air

The evaporative heat exchanger 101 is arranged to bring air $B_1$ from the exterior E of e.g. a building via the product channel 106 and supply it $B_2$ at a temperature $T_P$ to the interior I of the building. The recirculation channel 150 allows ventilation of air $C_1$ from the building interior I to the exterior E as a flow $C_2$. Under normal circumstances, the volumetric flow of ventilated air $C_2$ may be substantially equal to the incoming air $B_2$. The temperature $T_1$ of the interior air being ventilated via the recirculation channel 150 may however be substantially cooler than the temperature $T_E$ of the exterior air $B_1$ entering the inlet 126 of the product channel 106. In order to improve the performance of the evaporative heat exchanger 101, instead of ventilating all the air $C_2$ to the exterior, a portion $C_3$ of this air may be recirculated back to the interior via the product channel 106. For this portion that is recirculated the temperature need only be increased from $T_1$ to $T_P$. In this arrangement, the recirculation valve 158 acts as a mixing arrangement for mixing the two air streams of exterior air $B_1$ and interior air $C_1$ for supplying to the product channel 106 according to the amount of fresh air required in the interior I. Although the recirculation bypass 156 and valve 158 are depicted adjacent to the first end of the housing it is noted that they may also be located at an intermediate position along the product channel 106 where the incoming product air $B_1$ has already been cooled to the temperature $T_1$. Alternatively they may be located outside the housing.

II. Heat Recovery

During cold periods, the evaporative heat exchanger 101 may be operated as a heat recovery and ventilation unit. Warm air $C_1$ from the interior I of the building may be ventilated to the exterior E and fresh air $B_1$ from the exterior may be supplied to the interior via the product channel 106. By opening the bypass valve 154 to direct flow from the recirculation channel 150 to the housing interior, a flow $C_4$ of warm interior air is caused to flow over the secondary surfaces 114 of the product channel 106 before exiting via the exhaust opening 124 as flow $C_5$. Heat transfer takes place from the ventilated air $C_4$ via the secondary surfaces 114 to the primary surfaces 110 of the product channel 106 where it warms the fresh exterior air $B_1$. This warmed exterior air $B_2$ is then supplied via outlets 128 to the interior I of the building. Such heat recovery enables substantial reductions in heating costs while ensuring an adequate supply of fresh air to ventilate the building. During heat recovery, operation of the liquid supply 130 to wet the secondary surfaces is not required. It has however been found that a limited supply of water to the primary surface 110 of the product channel 106 may be desirable in maintaining adequate humidity under e.g. dry winter conditions. Under such circumstances, the working channel 104 is not used. It is however possible to provide alternative valving arrangements to allow the working channel to also function as a product channel during heat recovery.

For extremely low temperature operation as a heat recovery device, it is also possible to provide frost protection for the incoming air $B_1$. This may be achieved by recirculating a small amount of the ventilated air $C_3$ into the product channel 106 adjacent to the inlet e.g. via the recirculation bypass 156 and recirculation valve 158. A small electrical preheater 159 or similar device may also be provided for frost protection at the inlets 126 of the product channels 106 (or around the exhaust 124). Such frost protection measures may serve to prevent the humid air exiting exhaust opening 124 from condensing. Such condensation may freeze and build up to effectively prevent heat transfer and even block flow through the exhaust opening 124.

Of significance, it should be noted that during heat recovery use, the flow through the product channel 106 takes place in the same direction as for cooling. The same applies for the recirculation channel 150. In particular the flow over the secondary surfaces 112, 114 always takes place in the direction of the exhaust 124 such that any contamination formed in the interior space of the housing 102 will be directed out of the building.

Figure 4:
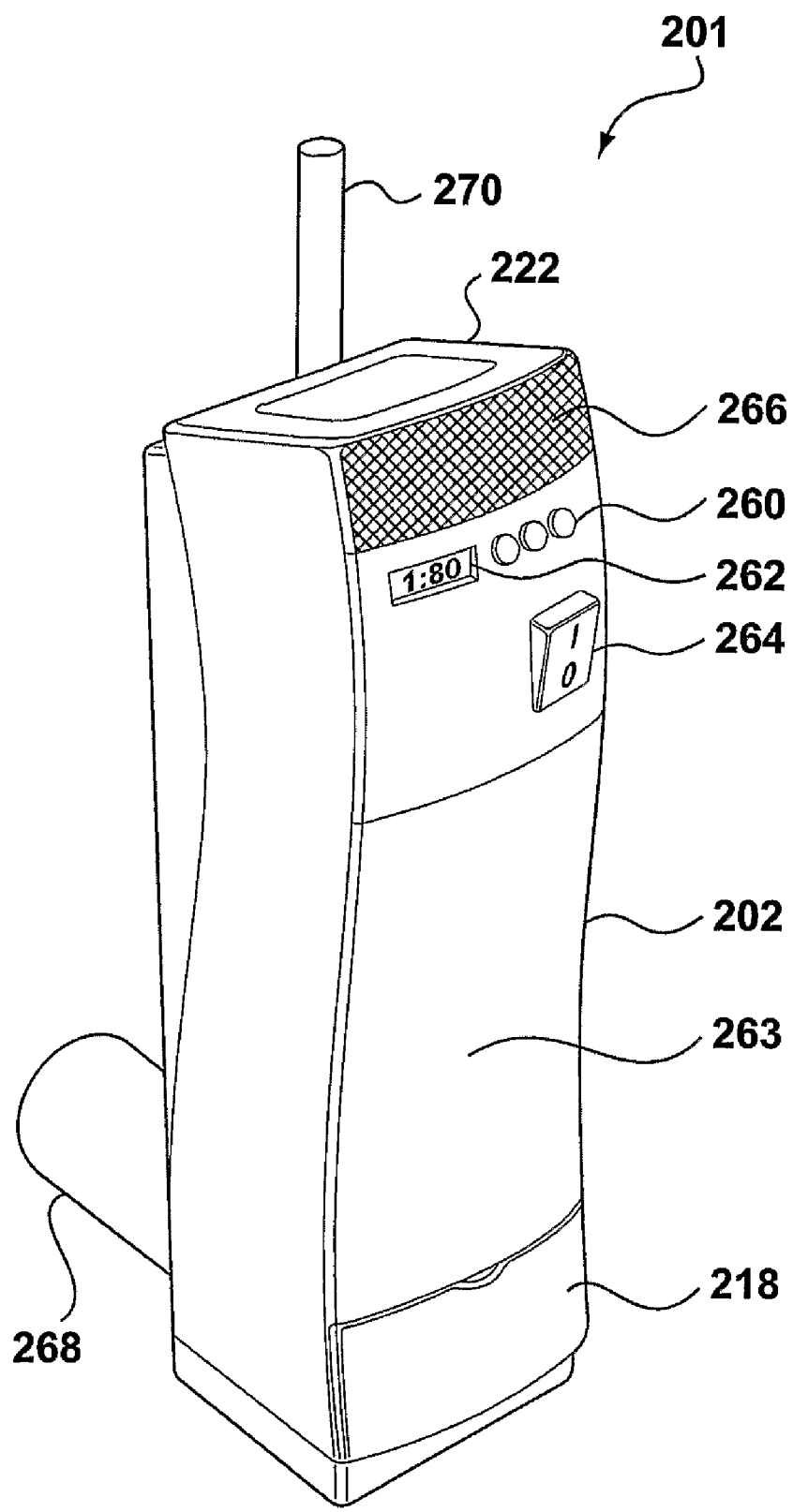
FIG. 4 is an external perspective view of a third and preferred embodiment of the present invention.

According to FIG. 4, there is shown a preferred embodiment of an evaporative heat exchanger 201 for domestic use. The heat exchanger 201 is generally similar to the devices described in FIG. 1 and FIG. 3 and like elements will be designated with the same reference numerals preceded by the numeral 2.

Heat exchanger 201 comprises a generally upright housing 202 suitable for location in a living space, preferably against an external wall. The housing 202 has a lower first end 218 and an upper second end 222 and includes input keys 260 and a display 262 on its front face 263 by which the device may be controlled. The front face 263 of the housing is also provided with a water refill opening 264 and an attractive outlet grill 266 at its upper end 222. To the rear of the housing, a duct 268 carries a number of air channels to the exterior of the building. A recirculation duct 270 serves as a connection to a source of air to be ventilated from the living space.

Figure 5:
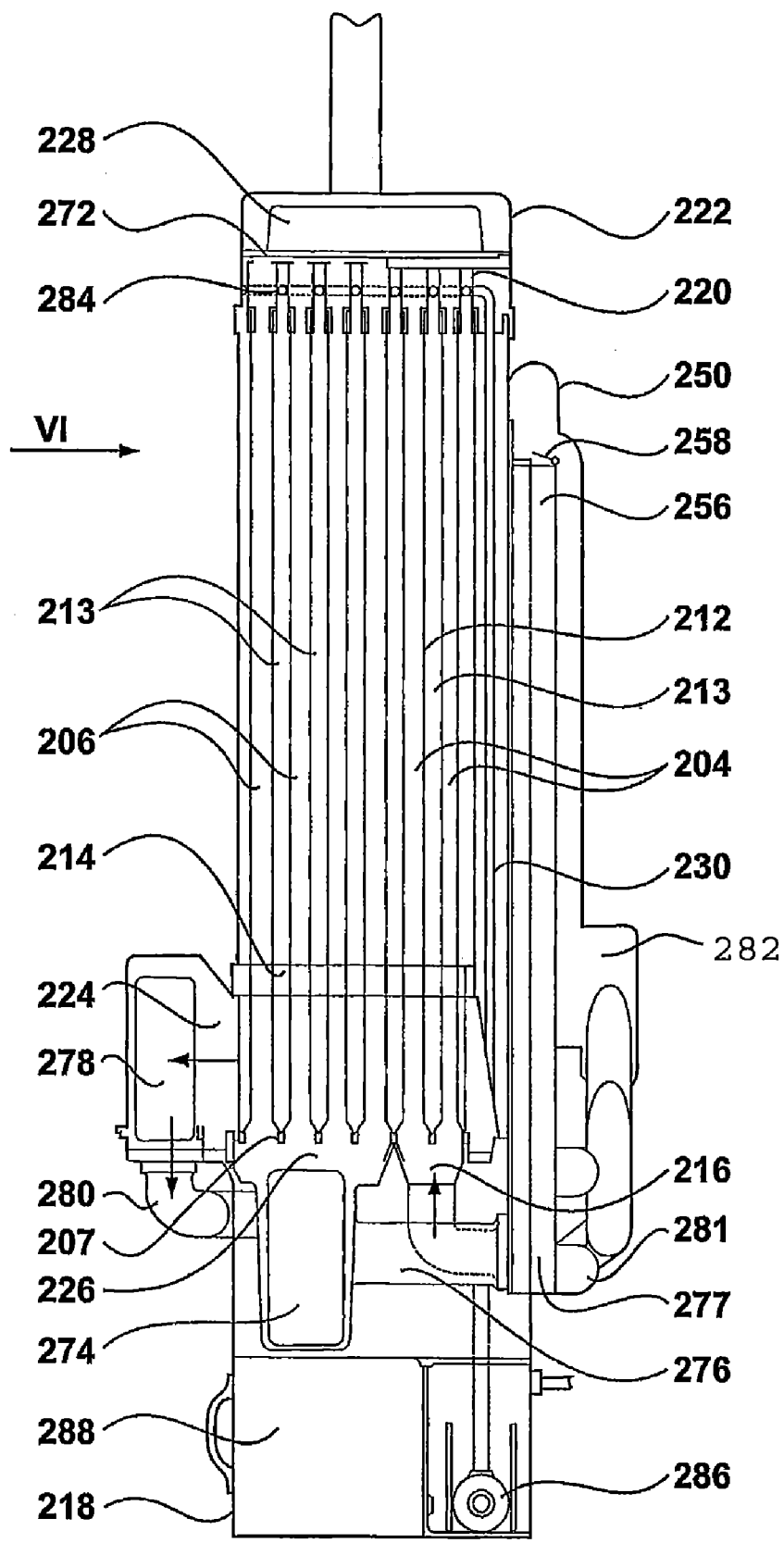
FIG. 5 is a front view of the interior of the embodiment of FIG. 4.

FIG. 5 shows a front view of the interior of the heat exchanger 201 with the external housing removed. In the interior of the heat exchanger 201 a number of product channels 206 are arranged. The product channels 206 are substantially as disclosed in FIG. 2 and are arranged generally vertically. At the first end 218 of the device, the lower edges of adjacent product channels 206 are crimped or otherwise joined together at seams 207 to form a combined product inlet 226 and also to close off the secondary surfaces 214 to form secondary channels 213 separate from the product channels 206. The upper ends of the product channels 206 are connected to communicate through a housing partition 272 with a combined outlet 228 that itself is in communication with the outlet grill 266 at the second end 222 of the housing.

The heat exchanger 201 also contains two working channels 204 of a similar design to the product channels 206, also closed off by a seam 207 at their lower edges to form a combined working inlet 216 and further secondary channels 213 having secondary surfaces 212. At their upper ends, the working channels 204 have outlets 220 that stop short of the partition 272 to communicate with the upper ends of the secondary channels 213.

A product fluid fan 274 is located immediately below the product inlet 226. Product fluid fan is an axial inflow fan having a maximum capacity of about 300 m3 per hour and is connected via a product inlet duct 276 through a filter chamber 277 and the duct 268 to receive a supply of air from the exterior of the building. Filter chamber 277 contains appropriate filters (not shown) for filtering of the product air entering into the evaporative heat exchanger 201. Alternatively or additionally a filter may be provided at the outlet 228 or at another convenient position in the flow. Filters may of course also be provided in the embodiments of FIGS. 1 and 3.

A working fluid fan 278 is also provided adjacent the lower end 218 of the housing 202 in communication with an exhaust 224 from the secondary channels 213. The working fluid fan 278 is further connected by a working outlet duct 280 through the duct 268 to the exterior of the building. At the inlet side of the working fluid circuit, the combined working inlet 216 is also connected via a working inlet duct 281 through the duct 268 to the exterior of the building. Although not shown in this view, the working inlet 216 may also be provided with a filter or may pass through a section of the filter chamber 277 hermetically separated from the product flow.

FIG. 5 also depicts a recirculation channel 250 connecting at its upper end to the recirculation duct 270. The recirculation channel 250 connects via a recirculation fan 282 and a recirculation outlet duct 283 through duct 268 to the exterior of the building. The recirculation channel 250 also connects via a recirculation bypass 256 provided with a recirculation valve 258 to the filter chamber 277. In this way, any recirculation air passing back into the interior of the building will also be filtered. A heat recovery bypass 252 and bypass valve 254 (not shown in this view) selectively connect the recirculation channel 250 with the upper ends of the secondary channels 213.

At the upper end of each of the secondary channels 213, there is located a water distributor 284. The water distributors 284 comprise drop forming outlets that provide a controlled supply of water drops to the secondary surfaces 212, 214 of both the product channels 206 and working channels 204. The water distributors 284 are supplied via water supply 230 by a pump 286 from a water reservoir 288. At the lower end of the secondary channels, excess water is collected in a gutter 285 and returned to the water reservoir 288 through a drain 289.

Figure 5A:
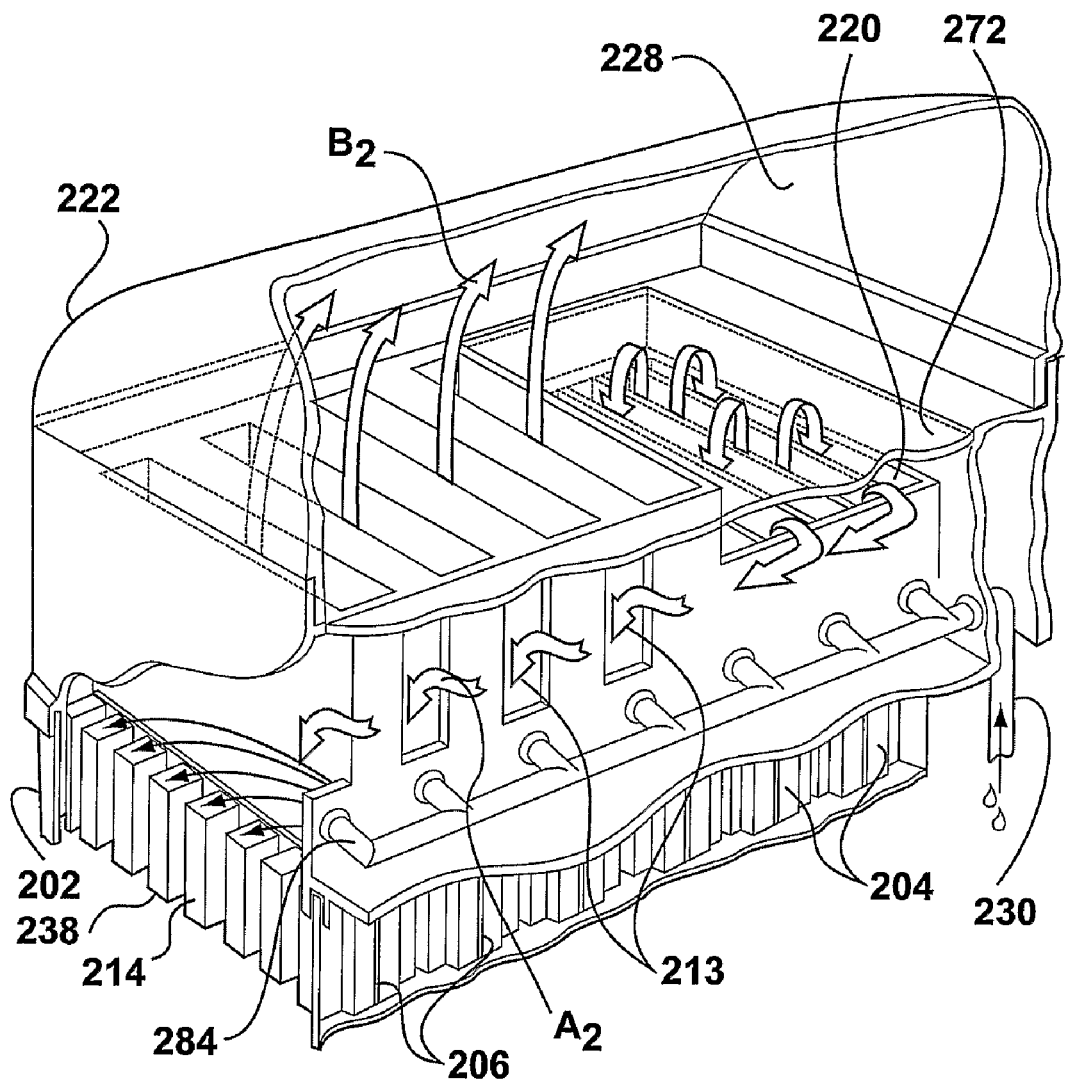
FIG. 5A is a partially cut-away, perspective view of a detail of FIG. 5 showing the upper ends of the channels.

Details of the upper end 222 of the housing 202 are better seen in FIG. 5a. which shows the manner of connection of the channels 204, 206. An upper manifold 271 receives the upper ends of the channels 204, 206 and is provided with appropriate openings for passage of the various flows. The area of the upper manifold 271 in which the working channels 204 are received is covered by the partition 272 whereby working fluid exiting the working channels 204 is forced to return via the secondary channels 213 of both the product and working fluid channels. The upper manifold 271 also supports the water distributors 284. These water distributors are arranged to spray water horizontally across the upper ends of the secondary channels 213 from where it can drip down to wet the secondary surfaces 212, 214. The supply of water to the water distributors is preferably intermittent and may be at a controlled pressure to vary the length of spray, thereby wetting equally across the width of the secondary channels 213. Drip trays may be arranged above the secondary channels to collect the spray from the nozzles and distribute it in drip form thereby avoiding nebulization into the secondary channels. Limiting the formation of aerosols in the air streams has been found important to ensuring efficient operation of the cooler and can also reduce the possible formation of bacteria.

Figure 5B:
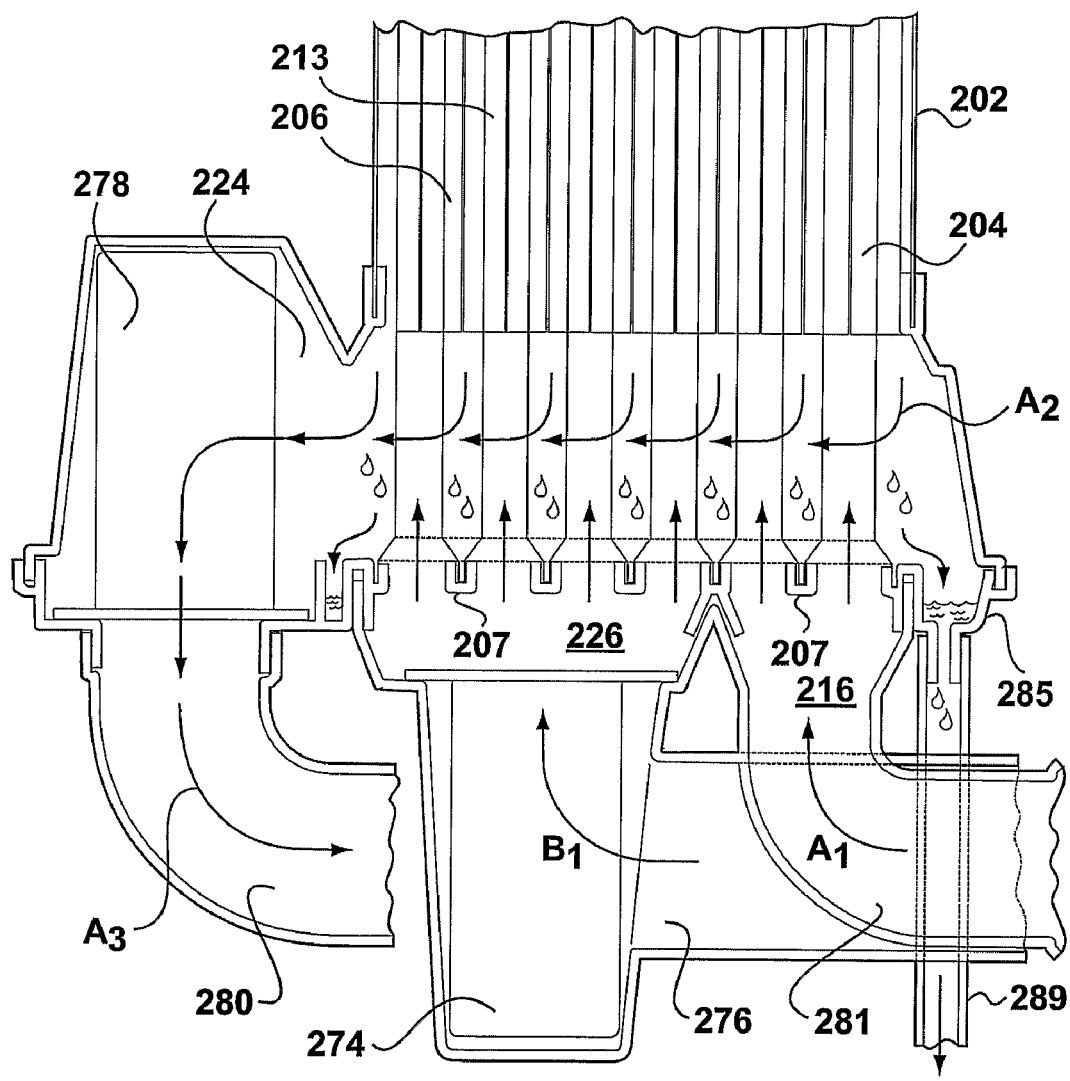
FIG. 5B is an enlarged front view of a detail of FIG. 5 showing the lower ends of the channels.

The lower end 218 of the housing 202 is also shown in further detail in FIG. 5b. A lower manifold 273 receives the lower ends of the channels 204, 206 in a similar manner to the upper manifold. The lower manifold 273 partially forms product inlet 226, working inlet 216 and exhaust 224 and also forms the gutter 285 and serves as the housing for the working fluid fan 278.

Figure 6:
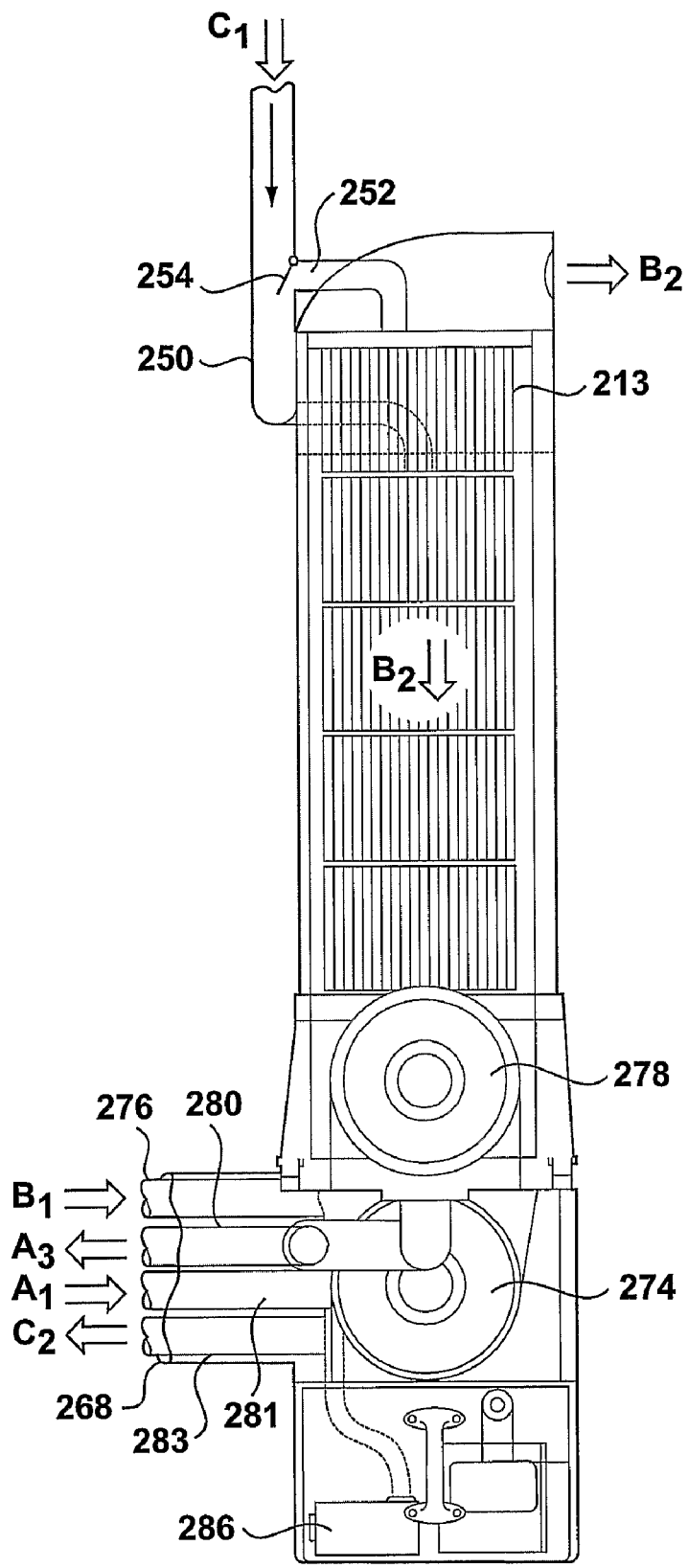
FIG. 6 is a side view of the interior of the embodiment of FIG. 4 taken in the direction VI.

FIG. 6 is a side view taken in the direction VI of FIG. 5. FIG. 6 shows the product fluid fan 274 and the working fluid fan 278 and also illustrates clearly the product inlet duct 276, the working inlet duct 281, the working outlet duct 280 and the recirculation outlet duct 283 all of which pass through duct 268 to the outside of the building. FIG. 6 also illustrates heat recovery bypass 252 and bypass valve 254 which connect the recirculation channel 250 with the upper ends of the secondary channels 213.

Operation of the evaporative heat exchanger 201 of FIGS. 4 to 6 is substantially the same as that of FIG. 3. In use, in a cooling mode, pump 286 operates to provide water to the water distributors 284 which cause wetting of the secondary surfaces 212, 214 of the secondary channels 213. The water retaining layer as described above in relation to FIG. 2, retains a quantity of water for subsequent evaporation.

The working fluid fan 278 causes a stream of working air $A_1$ to be drawn in from the exterior of the building through working inlet duct 281 and working channels 204. The working air $A_1$ is cooled by evaporation of water from the secondary surfaces 212 and exits the working channels 204 at the outlets 220 having a temperature close to the dew point. This working air $A_1$ is then distributed within the housing interior to all the secondary channels 213 through which it returns in a downward direction as flow $A_2$ driving the evaporation taking place from the secondary surfaces 212, 214. The humidified air $A_3$ then exits through exhaust 224 and working fluid fan 278 via working outlet duct 280 to the exterior of the building. As mentioned above, the working air flow follows a substantially complete circuit from a working inlet duct 281 to a working outlet duct 280 located adjacent to one another. As such, the local pressure conditions prevailing at the exterior of the building can have little or no effect on this circulation and regulation of the flow may be easily achieved e.g. by regulation of the working fluid fan 278.

As the working air A circulates through the evaporative heat exchanger 201, the product fluid fan is also caused to operate. Fresh air $B_1$ is drawn in from the exterior of the building through product inlet duct 276 and filter 277 and supplied as product air to combined product inlet 226. The product air as it passes through product channels 206 is then cooled by evaporation taking place from the secondary surfaces 214. The product air exits the product channels 206 and is supplied to the building interior via combined outlet 228 and outlet grill 266 as flow $B_2$ at a temperature close to the dew point.

Entry of product air into the building interior must be balanced by a corresponding outward flow of air from the building interior. This air may be allowed to exit through natural openings present in the building as "leakage". Alternatively, it can be controlled by operation of the recirculation fan 282 to draw the air $C_1$ from a recirculation inlet (not shown) through the recirculation channel 250 for discharge $C_2$ through recirculation outlet duct 283. By regulating the flow through the recirculation fan 282, the relation between the "leakage" and the air $C_2$ exiting via the recirculation outlet duct 283 can be controlled. This control can be used to determine the extent of the building cooled by the evaporative heat exchanger 201, since increased "leakage" flow will be associated with a greater distribution of cooling and increased flow via the recirculation outlet duct 283 will keep the cooling effect of the product flow $B_2$ local.

For operation in a heat recovery mode, the bypass valve 254 connects the recirculation channel 250 with the upper ends of the secondary channels 213 via the heat recovery bypass 252. The warm interior air $C_1$ flows through the secondary channels 213, heating the product air $B_1$. In this mode, the interior air $C_2$ will exit through the exhaust 224 and working fluid fan 278 via working outlet duct 280 to the exterior of the building instead of working air $A_3$. The working channels 204 and recirculation outlet duct 283 need not be used but with appropriate valving may also be used for product fluid in heat recovery mode. For frost prevention as mentioned in relation to FIG. 3, a flow of air $C_3$ may be provided via recirculation bypass 256 to the inlet of the product channels 206 via recirculation valve 258.

Figure 7:
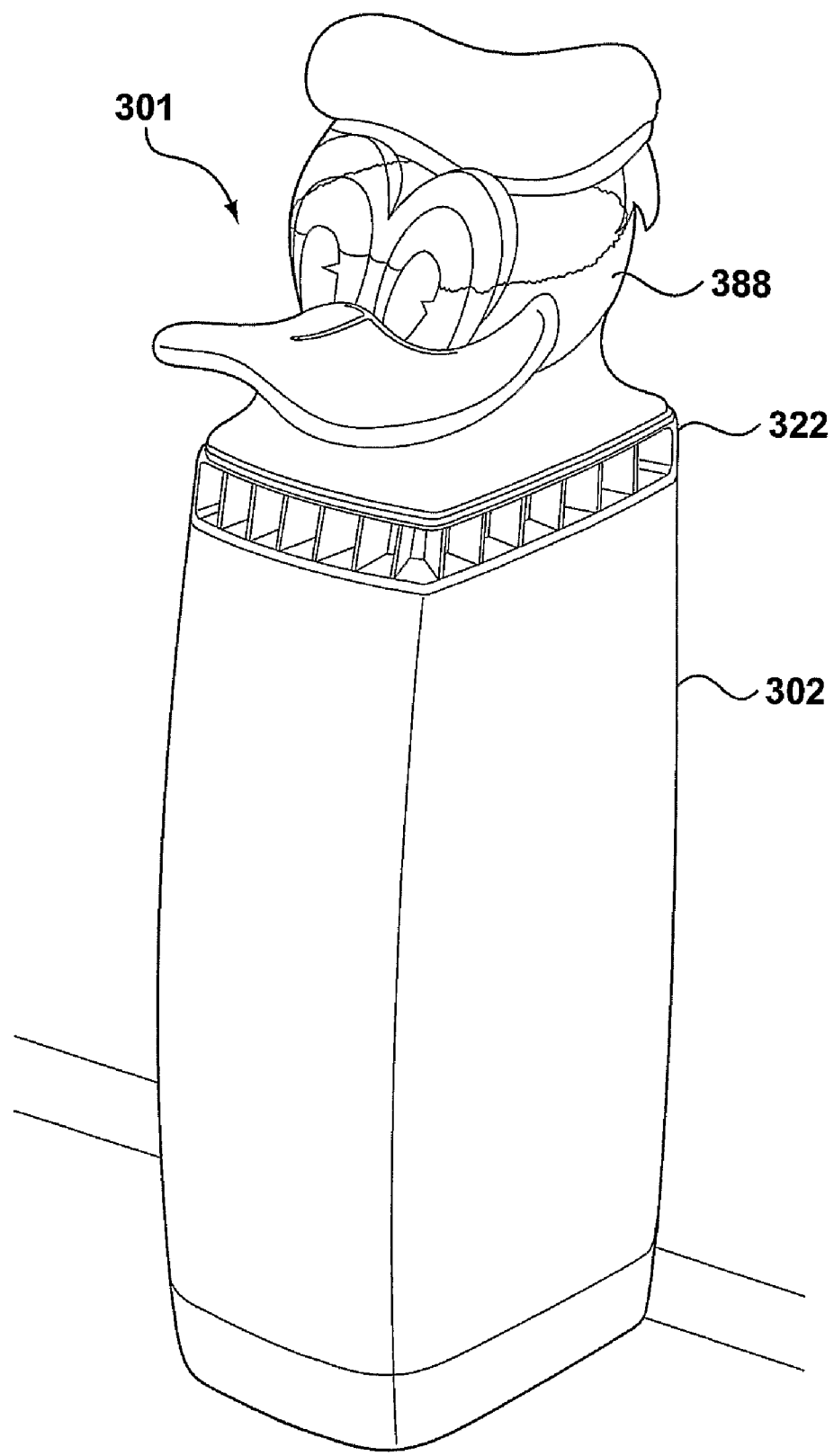
FIG. 7 is an external perspective view of a furth embodiment of the present invention.

FIG. 7 shows an external perspective view of an alternative evaporative heat exchanger 301 for domestic use. The heat exchanger 301 is internally of a similar construction to the device 201 shown in FIGS. 4 to 6 and only the external details will be further described.

Heat exchanger 301 comprises a generally upright housing 302 especially suitable for location in a child's bedroom. According to this embodiment, a water reservoir 388 is provided at the upper end 322 of the housing 302 in the form of a childhood character. The reservoir 388 is removable for refilling and is partially transparent such that the water level can be easily observed. Refilling of the reservoir becomes a simple and attractive activity for even the younger members of a family. Alternative forms of reservoir may be provided and may also include fill openings in the form of e.g. a mouth.

While the above examples illustrate preferred embodiments of the present invention it is noted that various other arrangements may also be considered which fall within the spirit and scope of the present invention as defined by the appended claims. In particular, although the evaporative heat exchangers shown have been described for use in a building interior, they may also be used within other structures such as vehicles or temporary accommodation. They may also be located externally with the ducts passing into the interior of the building. Furthermore, because of the advantageous arrangement of the working fluid circuit, the evaporative heat exchanger may be located at a distance from the source of external air e.g. as a mobile unit connected by a flexible duct.

The evaporative heat exchanger may also be provided with further functions or combined with other units, including improved filter systems for e.g. allergy sufferers, UV treatment, fragrance or essential oils dispensers and ionising devices for providing for ionisation of the product air. It may also be used in combination with a computer device to provide it appropriate cooling e.g based on computer load.

The invention claimed is:

1. An evaporative heat exchanger comprising:
at least one working channel comprising primary and secondary surfaces;
for each working channel, a plurality of product channels comprising primary and secondary surfaces; and
a liquid supply providing an evaporative liquid to the secondary surfaces;
wherein a product fluid may circulate through the product channels in heat exchanging contact with the primary surfaces thereof and wherein the primary surface of the working channel is in flow communication with the secondary surfaces of both the working channel and the product channels such that a working fluid may flow first over a primary surface of the working channel and subsequently over the secondary surfaces;
further comprising a housing, the working channel and the product channels being located within the housing whereby an interior space between the housing and the working and product channels defines a flow area for the working fluid to flow over the secondary surfaces;
the working channel has an inlet communicating with an exterior of the housing and an outlet communicating with the interior space;
the product channels each have an inlet and an outlet each of which communicates with an exterior of the housing; and
wherein the inlets of the working channel and product channels communicate with ambient air, and that the outlet of each product channel communicates with a living space in a building or vehicle.

2. The evaporative heat exchanger according to claim 1, further comprising heat transfer elements located on the secondary surfaces for transferring heat from the secondary surfaces to the working fluid.

3. The evaporative heat exchanger according to claim 1, further comprising heat transfer elements located on the primary surfaces of the product channel and the working channel for transferring heat from the product fluid and the working fluid respectively to the primary surfaces.

4. The evaporative heat exchanger according to claim 1, wherein the working channel comprises a tubular membrane, the primary surface being located on an interior of the tubular membrane and the secondary surface being located on the exterior of the tubular membrane.

5. The evaporative heat exchanger according to claim 1, wherein the product channels comprise tubular membranes, the primary surfaces being located on the interiors of the tubular membranes and the secondary surfaces being located on the exteriors of the tubular membranes.

6. The evaporative heat exchanger according to claim 1, wherein the housing has an exhaust communicating the interior space with an exterior of the housing for exhaust of the working fluid after it has passed over the secondary surfaces.

7. The evaporative heat exchanger according to any of claim 1, further comprising a recirculation channel and wherein the housing has a heat recovery bypass for selectively allowing entry of a recirculation fluid from the recirculation channel into the interior space for flow over the secondary surfaces.

8. The evaporative heat exchanger according to claim 7, wherein the heat recovery bypass comprises a bypass valve for switching the source of the fluid supplied to the secondary surfaces between the primary surface of the working channel in a cooling mode and the recirculation channel in a heat recovery mode.

9. The evaporative heat exchanger according to claim 1, wherein the evaporative heat exchanger comprises a recirculation channel, further comprising a mixing arrangement for selectively connecting the recirculation channel to the inlet of the product channels.

10. The evaporative heat exchanger according to claim 1 further comprising a product fluid circulation device to cause circulation of a product fluid through the product channels.

11. The evaporative heat exchanger according to claim 9, further comprising a balance flow circulation device for causing circulation through the recirculation channel of a balance flow of fluid to at least partially balance the flow of product fluid.

12. The evaporative heat exchanger according to claim 1 further comprising a working fluid circulation device to cause circulation of the working fluid through the working channel and through the interior space.

13. The evaporative heat exchanger according to claim 1, wherein the working channel and the product channels are generally parallel and the working fluid and the product fluid flow through the working channel and the product channel respectively in a first direction and the working fluid subsequently flows over the secondary surfaces in a second direction substantially opposite to the first direction.

14. The evaporative heat exchanger according to claim 13, further comprising a recirculation channel, further comprising a mixing arrangement for selectively connecting the recirculation channel to the inlet of the product channels; wherein the recirculation channel is generally parallel to the product channels and the flow through the recirculation channel takes place in the second direction.

15. The evaporative heat exchanger according to claim 1, further comprising a liquid retaining layer at least partially covering the secondary surfaces, the liquid retaining layer allowing heat conduction to take place between the secondary surfaces and the working fluid.

16. A method of cooling a product air in an evaporative heat exchanger comprising a working channel having primary and secondary surfaces and a product channel having primary and secondary surfaces, the method comprising:

provide an evaporative liquid to the secondary surfaces;

passing a first volume of a working ambient air through the working channel in heat exchanging contact with its primary surface to cool the working ambient air from an inlet temperature to close to its dew point temperature;

thereafter passing the working ambient air over the secondary surfaces of both the working channel and the product channel to cause evaporation of the evaporative liquid into the working ambient air and heating of the working ambient air by conduction from the secondary surfaces whereby heat is transferred from the respective primary surfaces to the respective secondary surfaces;

passing a second volume of product ambient air through the product channel in heat exchanging contact with its primary surface such that the product ambient air is cooled by heat transfer to the primary surface, the second volume being substantially greater than the first volume; and subsequently communicating the product ambient air to a living space in a building or vehicle.

17. The method according to claim 16, wherein the working ambient air flows over the secondary surfaces substantially in counter flow to the flow over the primary surfaces and is heated to substantially its inlet temperature.

18. The method according to claim 16, wherein the second volume is at least three times greater than the first volume.

19. The method according to claim 16, wherein the evaporative liquid is provided intermittently to the secondary surfaces.

20. A cooling and heat recovery device comprising:

an evaporative heat exchanger having at least a product channel and a working channel in heat exchanging contact with one another, the product channel providing a flow of product ambient air from a first environment to a living space in a building or vehicle;

a recirculation channel providing a flow of recirculation air from the living space in the building or vehicle to the first environment; and a switching device for selectively connecting the recirculation channel to the working channel for heat recovery from the recirculation air.

21. The cooling and heat recovery device according to claim 20 comprising an evaporative heat exchanger comprising:

at least one working channel comprising primary and secondary surfaces;

for each working channel, a plurality of product channels comprising primary and secondary surfaces; and a liquid supply providing an evaporative liquid to the secondary surfaces;

wherein a product air may circulate through the product channels in heat exchanging contact with the primary surfaces thereof and wherein the primary surface of the working channel is in flow communication with the secondary surfaces of both the working channel and the product channels such that a working air may flow first over a primary surface of the working channel and subsequently over the secondary surfaces.

* * * * *